United States Patent
Nammi

(10) Patent No.: US 12,095,488 B2
(45) Date of Patent: Sep. 17, 2024

(54) LOW COMPLEXITY TRANSMITTER STRUCTURE FOR ACTIVE ANTENNA SYSTEMS

(71) Applicant: AT&T Intellectual Property I, L.P., Atlanta, GA (US)

(72) Inventor: SaiRamesh Nammi, Kista (SE)

(73) Assignee: AT&T Intellectual Property I, L.P., Atlanta, GA (US)

( * ) Notice: Subject to any disclaimer, the term of this patent is extended or adjusted under 35 U.S.C. 154(b) by 105 days.

(21) Appl. No.: 17/875,331

(22) Filed: Jul. 27, 2022

(65) Prior Publication Data

US 2022/0376721 A1 Nov. 24, 2022

Related U.S. Application Data

(63) Continuation of application No. 16/875,284, filed on May 15, 2020, now Pat. No. 11,424,773, which is a continuation of application No. 16/438,741, filed on Jun. 12, 2019, now Pat. No. 10,693,508, which is a continuation of application No. 15/841,245, filed on Dec. 13, 2017, now Pat. No. 10,361,733.

(51) Int. Cl.
| | |
|---|---|
| *H04B 1/04* | (2006.01) |
| *H04B 17/10* | (2015.01) |
| *H04B 17/13* | (2015.01) |
| *H04W 52/52* | (2009.01) |

(52) U.S. Cl.
CPC ......... *H04B 1/0475* (2013.01); *H04B 17/104* (2015.01); *H04B 17/13* (2015.01); *H04W 52/52* (2013.01); *H04B 2001/0425* (2013.01)

(58) Field of Classification Search
CPC ...... H04B 1/0475; H04B 1/104; H04B 17/13; H04B 2001/0425; H04W 52/52
See application file for complete search history.

(56) References Cited

U.S. PATENT DOCUMENTS

| | | | |
|---|---|---|---|
| 6,288,606 B1 | 9/2001 | Ekman et al. | |
| 6,329,875 B1 | 12/2001 | Ishida et al. | |
| 6,587,514 B1 | 7/2003 | Wright et al. | |
| 6,697,436 B1 | 2/2004 | Wright et al. | |
| 6,798,843 B1 | 9/2004 | Wright et al. | |
| 7,362,821 B1 | 4/2008 | Shirali | |
| 7,385,447 B1 | 6/2008 | Adar | |
| 8,085,869 B2 | 12/2011 | Behzad | |
| 8,174,314 B2 | 5/2012 | Koren | |
| 8,218,678 B2 | 7/2012 | Kim | |
| 8,351,543 B2 | 1/2013 | Kenington | |

(Continued)

OTHER PUBLICATIONS

Non-Final Office Action received for U.S. Appl. No. 15/841,245 dated Sep. 26, 2018, 19 pages.

(Continued)

*Primary Examiner* — Janice N Tieu

(57) ABSTRACT

Various embodiments disclosed herein provide for a low complexity transmitter structure for active antenna arrays by reducing the number of digital predistortion extraction loops that need to be performed. Digital predistortion (DPD) corrects any non-linearities in a power amplifier. By determining which power amplifiers have similar characteristics in an array, and thus may use similar predistortion coefficients, once the DPD coefficients are determine for one of the grouped power amplifiers, DPD can be performed on each of the grouped power amplifiers based on the DPD coefficients.

20 Claims, 10 Drawing Sheets

(56) References Cited

U.S. PATENT DOCUMENTS

| | | | |
|---|---|---|---|
| 8,385,391 | B2 | 2/2013 | Balasubramanian et al. |
| RE44,093 | E | 3/2013 | Roh |
| 8,451,055 | B2 | 5/2013 | Fudaba et al. |
| 8,542,767 | B2 | 9/2013 | Silverman et al. |
| 8,995,572 | B1 | 3/2015 | Wu |
| 9,130,628 | B1 | 9/2015 | Mittal et al. |
| 9,276,533 | B2 | 3/2016 | Lozhkin |
| 9,621,200 | B2 | 4/2017 | Janani et al. |
| 9,722,644 | B2 | 8/2017 | Heiskanen et al. |
| 9,762,302 | B1 | 9/2017 | Shaked |
| 9,787,335 | B1 | 10/2017 | Jeong et al. |
| 2006/0164167 | A1 | 7/2006 | Hicking |
| 2008/0088369 | A1 | 4/2008 | Bowles et al. |
| 2009/0021320 | A1 | 1/2009 | De Jong et al. |
| 2010/0087227 | A1 | 4/2010 | Francos et al. |
| 2010/0127932 | A1 | 5/2010 | Heikkinen et al. |
| 2011/0235748 | A1 | 9/2011 | Kenington |
| 2012/0328050 | A1 | 12/2012 | Bai et al. |
| 2013/0063208 | A1 | 3/2013 | Acimovic |
| 2014/0125416 | A1 | 5/2014 | Widdowson et al. |
| 2014/0292579 | A1 | 10/2014 | Oh et al. |
| 2016/0278028 | A1* | 9/2016 | Hachiya ............ H03F 1/3241 |
| 2018/0316367 | A1* | 11/2018 | Johansson ........... H04B 1/0475 |
| 2019/0068429 | A1* | 2/2019 | Sagi ................ H04B 1/0483 |
| 2019/0089389 | A1* | 3/2019 | Gutman ............... H03F 3/24 |
| 2019/0312613 | A1 | 10/2019 | Guan |
| 2023/0163794 | A1* | 5/2023 | Meir ................ H04B 1/0475 455/114.2 |

OTHER PUBLICATIONS

Notice of allowance received for U.S. Appl. No. 15/841,245 dated Mar. 11, 2019, 16 pages.

Helaoui et al., "Power and efficiency enhancement of 3G multicarrier amplifiers using digital signal processing with experimental validation", IEEE Transactions on Microwave Theory and Techniques, vol. 54, No. 4, Apr. 2006, 10 pages.

Mekechuk et al., "Linearizing Power Amplifiers Using Digital Predistortion, EDA Tools and Test Hardware", Apr. 2004, High Frequency Electronics, Copyright © 2004 Summit Technical Media, LLC, 9 pages.

Aghasi et al., "A modified model and linearization method for solid state power amplifier", Analog Integr Circ Sig Process (2007) 51:81--S8, DOI 10.1007/s10470-007-9035-y, published online May 2007, 8 pages.

Non-Final Office Action received for U.S. Appl. No. 16/438,741 dated Dec. 16, 2019, 25 pages.

Notice of Allowance received for U.S. Appl. No. 16/438,741 dated Feb. 14, 2020, 23 pages.

Office Action mailed Aug. 5, 2021 for U.S. Appl. No. 16/875,284, 33 pages.

Office Action mailed Jan. 6, 2022 for U.S. Appl. No. 16/875,284, 19 pages.

Notice of Allowance mailed Apr. 18, 2022 for U.S. Appl. No. 16/875,284, 29 pages.

* cited by examiner

LOW COMPLEXITY TRANSMITTER STRUCTURE FOR ACTIVE ANTENNA SYSTEMS

RELATED APPLICATIONS

The subject patent application is a continuation of, and claims priority to each of, U.S. patent application Ser. No. 16/875,284, filed May 15, 2020, and entitled "A LOW COMPLEXITY TRANSMITTER STRUCTURE FOR ACTIVE ANTENNA SYSTEMS," which is a continuation of U.S. patent application Ser. No. 16/438,741 (now U.S. Pat. No. 10,693,508), filed Jun. 12, 2019, and entitled "A LOW COMPLEXITY TRANSMITTER STRUCTURE FOR ACTIVE ANTENNA SYSTEMS," which is a continuation of U.S. patent application Ser. No. 15/841,245 (now U.S. Pat. No. 10,361,733), filed Dec. 13, 2017, and entitled "A LOW COMPLEXITY TRANSMITTER STRUCTURE FOR ACTIVE ANTENNA SYSTEMS," the entireties of these applications being hereby incorporated by reference herein.

TECHNICAL FIELD

The present application relates generally to the field of mobile communication and, more specifically, to a low complexity transmitter structure for active antenna systems.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
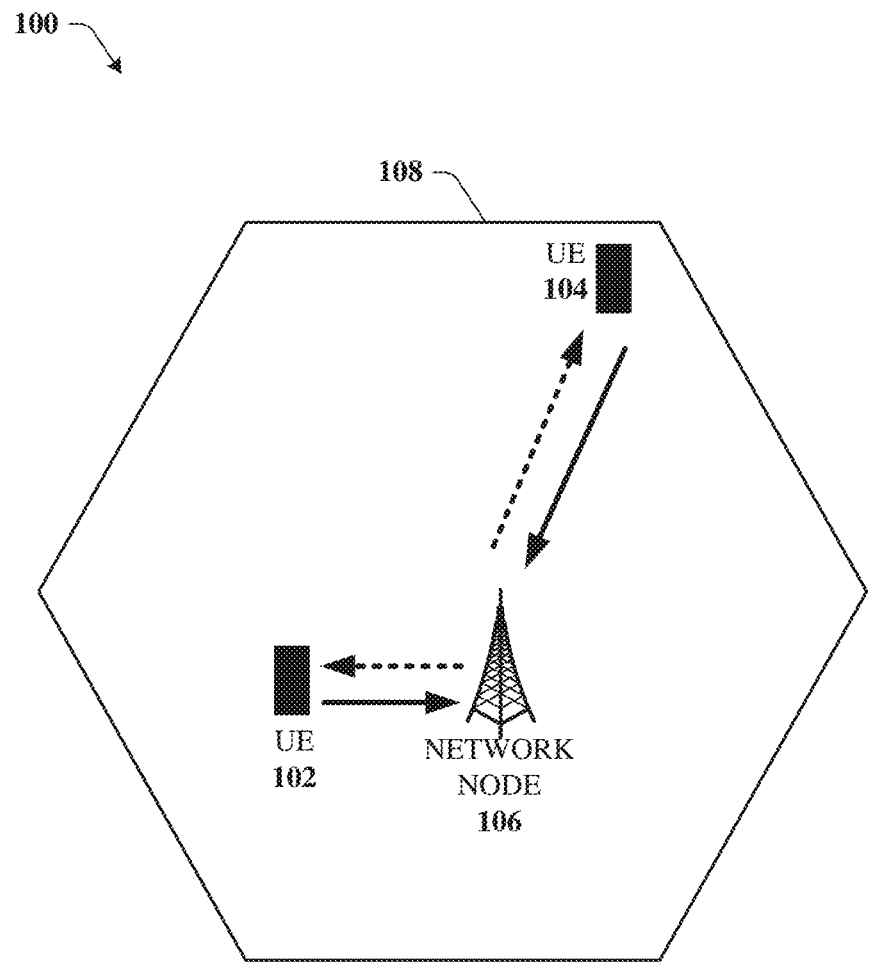
FIG. 1 illustrates an example wireless communication system in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

In various embodiments, a transmitter device can comprise a processor and a memory that stores executable instructions that, when executed by the processor facilitate performance of operations. The operations can comprise identifying a first digital pre-distortion coefficient of a first power amplifier. The operations can also comprise identifying a second digital pre-distortion coefficient of a second power amplifier, wherein the first digital pre-distortion coefficient and the second digital pre-distortion coefficient are associated with a first power amplification nonlinearity associated with the first power amplifier and a second power amplification nonlinearity associated with the second power amplifier, respectively. The operations can also comprise determining that the first digital pre-distortion coefficient and the second digital pre-distortion coefficient are similar according to a similarity criterion and applying a first pre-distortion signal to the first power amplifier and the second power amplifier based on the first digital pre-distortion coefficient and the second digital pre-distortion coefficient.

In another embodiment, method comprises transmitting, by a transmitter device comprising a processor, a baseline signal via a group of power amplifiers associated with respective antennas of an active array antenna transmitter. The method can also comprise measuring, by the transmitter device, outputs of the group of power amplifiers to determine respective nonlinearities of power amplifiers of the group of power amplifiers. The method can also comprise determining, by the transmitter device, based on the respective nonlinearities, that a first power amplifier and a second power amplifier have a first predistortion coefficient and a second predistortion coefficient respectively that are similar according to a similarity criterion, wherein the first predistortion coefficient and the second predistortion coefficient relate to correcting a first nonlinearity associated with the first power amplifier and a second nonlinearity associated with the second power amplifier. The method can also comprise, based on the first predistortion coefficient, applying, by the transmitter device, a predistortion signal to the first power amplifier and the second power amplifier.

In another embodiment machine-readable storage medium, comprising executable instructions that, when executed by a processor of a device, facilitate performance of operations. The operations can comprise determining a first digital pre-distortion coefficient of a first power amplifier; and determining a second digital pre-distortion coefficient of a second power amplifier, wherein the first digital pre-distortion coefficient and the second digital pre-distortion coefficient are associated with power amplifier nonlinearities of the first power amplifier and the second power amplifier. The operations can also comprise determining that the first digital pre-distortion coefficient and the second digital pre-distortion coefficient are similar according to a similarity criterion. The operations can also comprise applying a first pre-distortion signal to the first power amplifier and the second power amplifier as a function of the first digital pre-distortion coefficient and the second digital pre-distortion coefficient.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Various embodiments disclosed herein provide for a low complexity transmitter structure for active antenna arrays by reducing the number of digital predistortion extraction loops that need to be performed. Digital predistortion (DPD) corrects any non-linearities in a power amplifier. By determining which power amplifiers have similar characteristics in an array, and thus may use similar predistortion coefficients, once the DPD coefficients are determine for one of the grouped power amplifiers, DPD can be performed on each of the grouped power amplifiers based on the DPD coefficients. DPD extraction can be performed at regular intervals to ensure that the power amplifiers are grouped correctly. Over time, and with different environmental characteristics, the non-linearities in the amplifiers can vary, and so the groupings may change.

The power amplifiers in the active antenna transmitters are determined to be similar to each other based on sending a baseline signal through each of the amplifiers and measuring the output. The non-linearities in the power amplifiers can be judged to be similar to each other if cost function of the outputs is lower than a predetermined threshold. A higher threshold would allow more amplifiers to be grouped together, reducing the complexity, but the digital predistortion performed on each amplifier may not be as effective as a lower threshold would have allowed for. Depending on how different the power amplifier non-linearities are and how many amplifiers there are that need to be corrected, different threshold values can be applied at different times, allowing for a more dynamic solution.

FIG. 1 illustrates an example wireless communication system 100 in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

It is well known that MIMO systems can significantly increase the data carrying capacity of wireless systems. For these reasons, MIMO is an integral part of the $3^{rd}$ and $4^{th}$ generation wireless systems. 5G systems will also employ MIMO systems also called massive MIMO systems (hundreds of antennas at the Transmitter side and/Receiver side). Typically, with a $(N_t, N_r)$, where $N_t$ denotes the number of transmit antennas and $N_r$ denotes the receive antennas, the peak data rate multiplies with a factor of $N_t$ over single antenna systems in rich scattering environment.

MIMO systems can be active array antennas systems where RF components such as power amplifiers and transceivers are integrated with an array of antennas elements. By contrast, in passive antennas array systems the baseband signals are boosted by power amplifiers and connected to the antennas by longer feedback cables. By using active antenna array, not only are cable losses reduced, leading to improved performance and reduced energy consumption, but also is the installation simplified and the required equipment space is reduced.

By using respective power amplifiers for each antenna element in an active array antenna system, power amplifier non-linearities are hard to correct for. When power amplifiers operate in the non-linear regions, some of the signals are leaked to the other frequency bands causing adjacent channel interference.

One exemplary method to compensate for the non-linearity of the power amplifier is to distort the input signal to the power amplifier (PA) such that the output signal from the PA is transformed to be close to what it would have been if the PA would have been linear. An example of such method is called Digital Pre-distortion (DPD) Technique. In general, DPD may interchangeably be called as a signal linearization circuitry or component or mechanism or scheme.

Let $y_1$ be the output signal at the output of the PA and let $x_1$ be the output signal from the baseband and $z1$ is the input signal to the PA. Note that, in this model, we consider only the impact due to nonlinear PA and in practical systems the PA is preceded by many other blocks such as digital to analog converter (DAC), local oscillator (LO) etc. The output signal can be expressed as $y_1=f_1(z_1)$ where $f_1(.)$ is a nonlinear function which characterizes the PA. With DPD, the above equations can be written as $y_2=f_1(g_1(x_1))$, where $g1(.)$ is the function which characterizes the DPD block. Note that DPD extraction block is chosen such that $y_2=f_1(g_1(x_1))=G_1 \cdot x_1$, Where G1 is the gain of PA. It can be seen from above equation that if g1 is properly chosen then the output of the PA is linear. If there are many power amplifiers, to individually correct for each power amplifier can be a complex and computationally intensive process. By grouping power amplifiers that have similar DPD coefficients together however, the same predistortion signal can be applied to each, resulting in a satisfactory correction and reducing adjacent channel interference while reducing the complexity.

Figure 2:
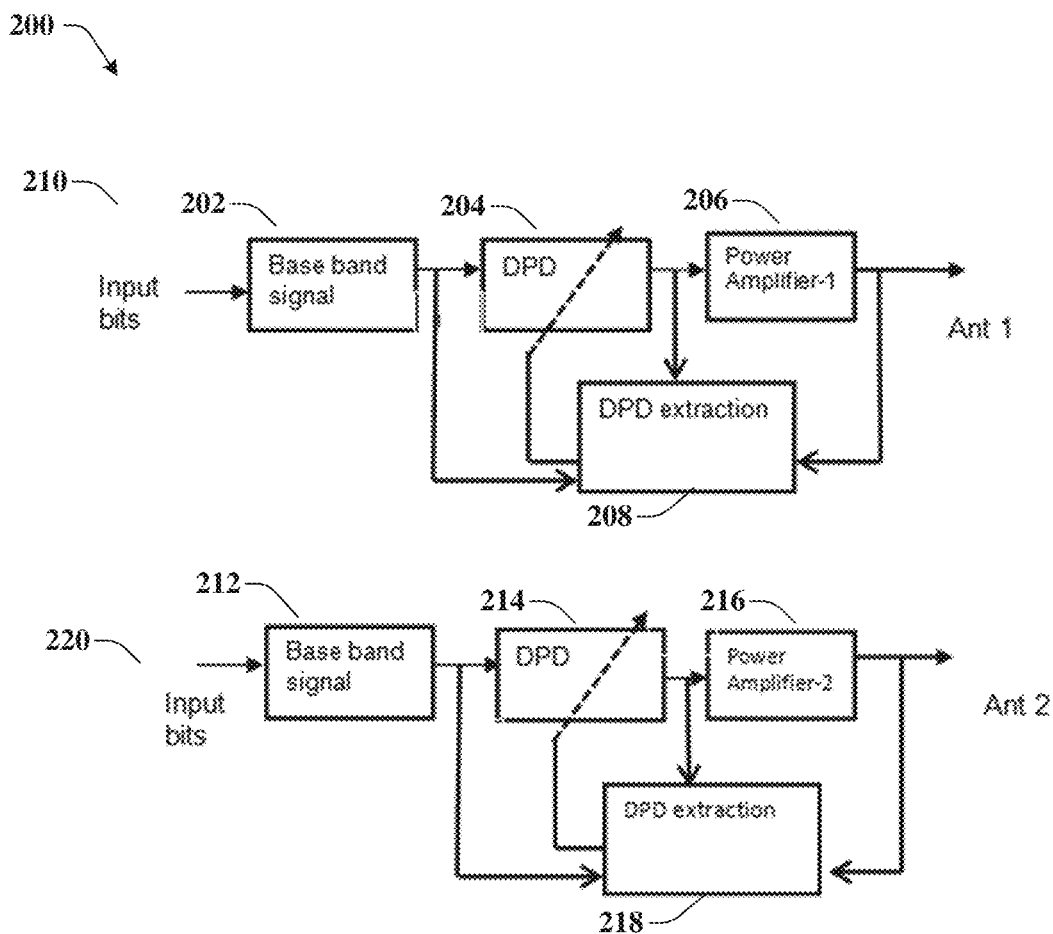
FIG. 2 illustrates an example block diagram of a group of active antennas with digital predistortion in accordance with various aspects and embodiments of the subject disclosure.

Turning now to FIG. 2, illustrated is an example block diagram 200 of a group of active antennas with digital predistortion in accordance with various aspects and embodiments of the subject disclosure.

Antennas 210 and 220 can each have a DPD extraction component 208 and 218 that samples the output of a power amplifier 206 and 216 to model the nonlinearities of the PAs 206 and 216. Once the nonlinearities are known, and the DPD coefficients can be determined, the DPD components 204 and 214 will apply a signal to baseband signals 202 and 212 before the power amplifier, such that the PAs' 206 and 216 output will be corrected to make the nonlinear aspects of the PAs 206 and 216 perform linearly.

In traditional DPD for an active antenna system, each of the DPD extraction blocks 208 and 218 are operating continuously, determining DPD coefficients and applying the DPD signal to the baseband signals 202 and 212 on a continual basis. These operations require a lot of computational resources and power consumption. In a massive MIMO system or in system with many transmit antennas (antenna elements), running a DPD loop for all the antenna elements is cumbersome and drains power resources rapidly, resulting in lower battery life for mobile devices.

According to an embodiment however, if the DPD extraction 218 determines that power amplifier 216 has a similar non-linearity as power amplifier 206, then it is possible for DPD block 214 to just apply the same DPD signal to baseband signal 212 as DPD block 204 applies to baseband signal 202. Applying the same correction to antenna 220, can result in an acceptable reduction in adjacent channel interference due to antenna 220's output while skipping the need to computationally determine the DPD coefficients for power amplifier 216.

In an embodiment, the DPD extractions 208 and 218 can sample the power amplifier non-linearities at defined periods or based on changing conditions. For instance, if the temperature changes more than a predetermined range of degrees, the power amplifier groupings can be predetermined as the nonlinearities may change, being a function of temperature.

Figure 3:
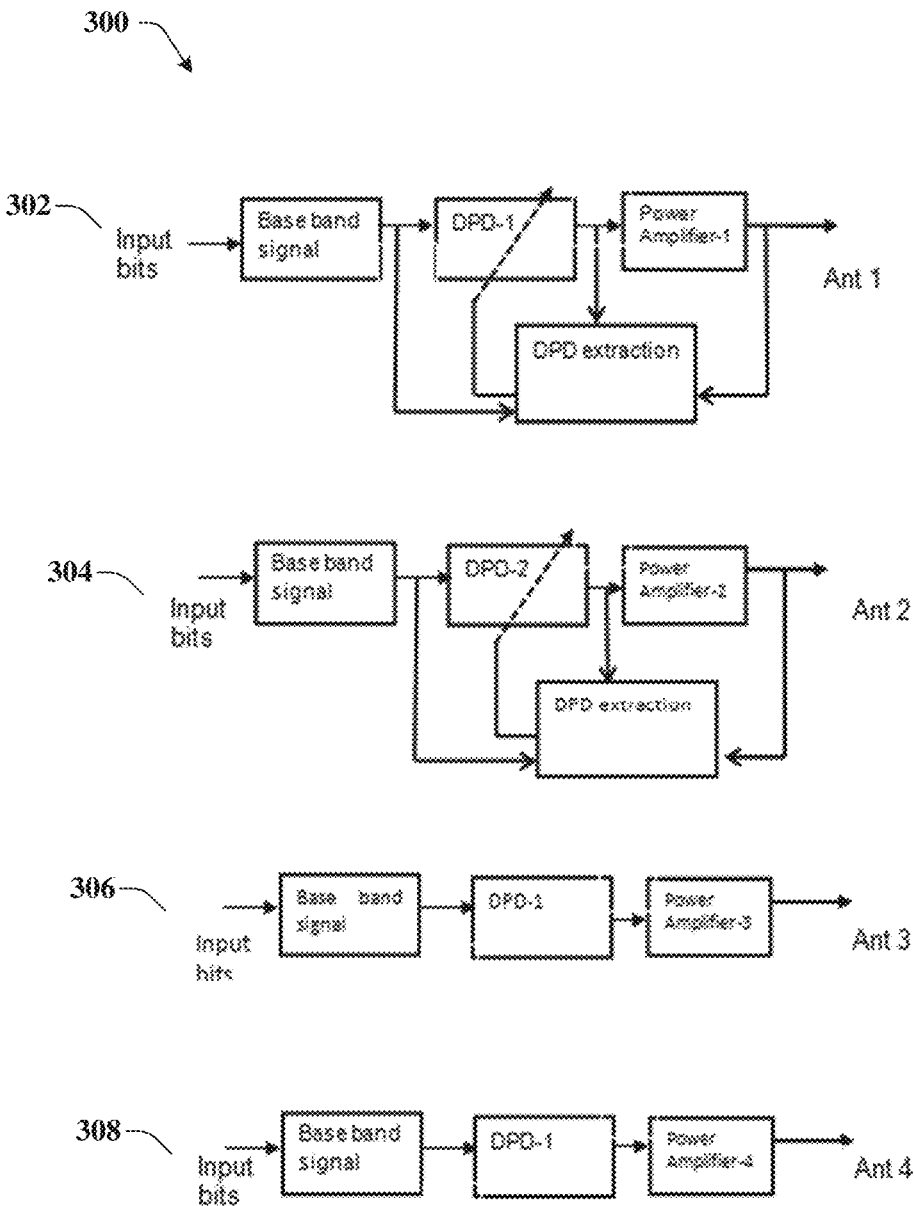
FIG. 3 illustrates an example block diagram of a group of active antennas with digital predistortion in accordance with various aspects and embodiments of the subject disclosure.

In FIG. 3, embodiment 300 shows an exemplary active antenna system with four antennas, 302, 304, 306, and 308. The power amplifiers for antenna 302, 306, and 308 have been determined to have non-linearities that are similar enough that the same DPD correction applied to antenna 302 can similarly be applied to antennas 306 and 308, while antenna 304 independent determines DPD coefficients since the non linearities for the power amplifier to antenna 304 are different than they are for antennas 302, 306, and 308.

Let $x_1$, $x_2$, $x_3$, and $x_4$ be the output signals from the baseband for respective antennas 302, 304, 306, and 308 and $z_1$, $z_2$, $z_3$ and $z_4$ be the input signal to each PA for respective antennas 302, 304, 306, and 308. The output signal can be expressed as $$y_1 = f_1(z_1),$$
$$y_2 = f_2(z_2),$$
$$y_3 = f_3(z_3),$$
$$y_4 = f_4(z_4)$$

Where f1 (.), f2 (.), f3 (.) and f4 (.) are nonlinear functions which characterizes the individual PAs. With DPD, the above equations can be written as $$y1 = f1(g1(x1)),$$
$$y2 = f2(g2(x2)),$$
$$y3 = f3(g3(x3)),$$
$$y4 = f4(g4(x4))$$

Where g1(.), g2(.), g3(.) and g4(.) are the functions which characterizes the individual DPD blocks. Note that DPD extraction blocks are chosen such that $$y1 = f1(g1(x1)) = G1.x1,$$
$$y2 = f2(g2(x2)) = G2.x2$$
$$y3 = f3(g3(x3)) = G3.x3$$
$$y4 = f4(g4(x4)) = G4.x4$$

Where G1, G2, G3 and G4 are the individual gains of each PA. It can be seen from above equations that if g1, g2, g3 and g4 are properly chosen, then the outputs of the PAs are linear and the emissions will be less.

In the embodiment shown in FIG. 3, when f1 (.) (antenna 302) is approximately equal to that of f3 (.)(antenna 306) and f4 (.)(antenna 308), then the above equation can be written as $$y1 = f1(g1(x1)) = G1.x1,$$
$$y2 = f2(g2(x2)) = G2.x2$$
$$y3 = f3(g1(x3)) \cong G3.x3$$
$$y4 = f4(g1(x4)) \cong G4.x4$$

In an embodiment, the non-linearities can be determined by passing a known baseline signal through each of the power amplifiers and examining the output of the power amplifiers to model the non-linearities. Using the embodiment in FIG. 3 as an example, for grouping, the same signal says x is transmitted from all the PAs. Say the output of the PA is given by f1(x), f2(x), f3(x) and f4(x) are the output signals from each PA associated with antennas 302, 304, 306, and 308. Then we need to identify which among them 4 are almost identical. Let's define the cost function of for comparison between two outputs as $J=(fi(x)-fj(x))*(fi(x)-fj(x))^H$ where i and j are from 1 to 4. Based on the PAs, i and j are grouped if $J \leq J_{th}$. Jth is a predefined threshold, and as can be seen from the equation, the range of similarity is larger as Jth increases. Thus, for a small Jth, power amplifiers are not as likely to be grouped together, resulting in lower adjacent channel interference, but increased computational costs and power consumption, while for a larger Jth, the computational costs and power consumption may be reduced greatly, but there may be increased adjacent channel interference.

The threshold for grouping power amplifiers can thus be dynamically adjusted depending on various conditions, as long as the adjacent channel leakage ratio stays below a predetermined threshold (e.g., below a 3GPP defined threshold). Non-linearities in power amplifiers can change as a function of time, age, temperature, and other environmental conditions. Accordingly, an acceptable level of adjacent channel interference at a higher Jth threshold at one time, may result in increased adjacent channel interference at the same Jth threshold at another time, and so the Jth threshold can be reduced to account for the changing conditions. These settings can also be adjusted by a degree based on changing user settings. For instance, if a mobile device with a MIMO transmitter is low on battery, or the user selects a battery saving mode, a higher Jth threshold can be selected for the mobile device. Similarly, if there is a large amount of interference, and or low signal to noise ratio for transmissions between the transmitter and receiver, the transmitter can reduce the threshold to decrease the adjacent channel interference.

Figure 4:
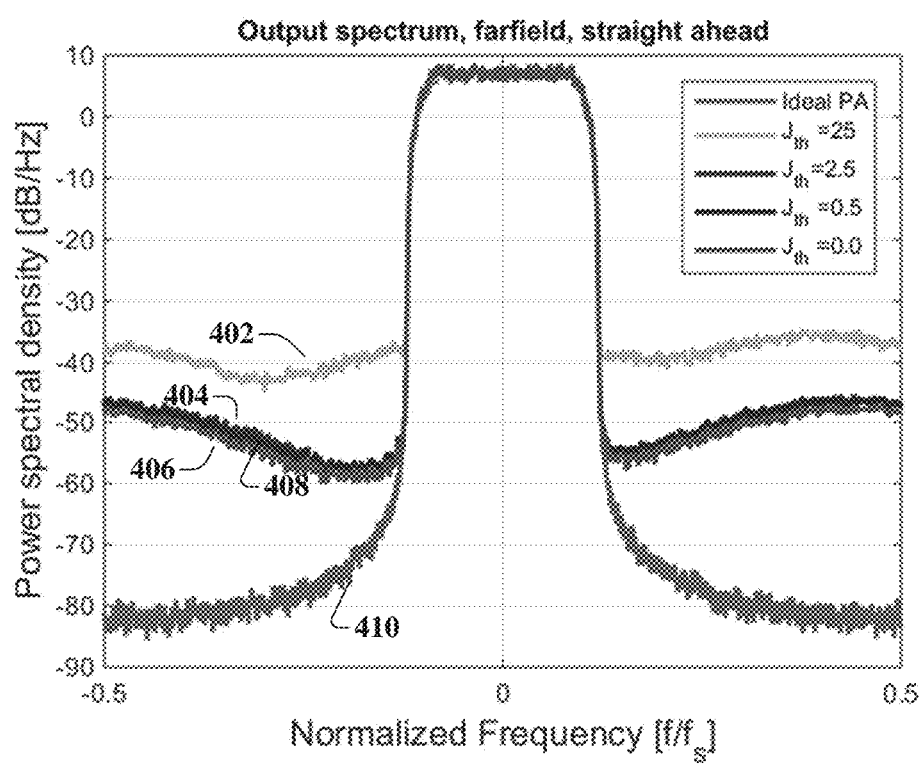
FIG. 4 illustrates an example graph showing power spectral density for different threshold settings in accordance with various aspects and embodiments of the subject disclosure.

Turning now to FIG. 4, illustrated is an example graph 400 showing power spectral density for different threshold settings in accordance with various aspects and embodiments of the subject disclosure. Line 410 can represent an ideal power amplifier output, with a peak at the selected frequency. Uncorrected power amplifiers can have high power densities at frequencies outside of the selected frequency due to the non-linearities of the power amplifiers. The DPD process lowers the amount of power density in the areas outside the channel by partially correcting for the non-linearities.

Graph 400 shows the simulator results showing power amplifier leakage at different Jth thresholds. Line 402 shows the performance where the Jth threshold is set to 25. But at lines 404, 406, and 408, representing a Jth threshold of 2.5, 0.5, and 0.0 respectively, the power leakage outside the band has been greatly reduced. In fact, there is very little benefit, at this particular time of selecting a Jth threshold of 0.0 over a Jth threshold of 2.5 as can be seen. The Jth threshold of 2.5 is a large improvement over the Jth threshold of 25, but there are diminishing returns to selecting a Jth threshold lower than 2.5. At another time though, the power density distribution can be different, and so the Jth threshold can be dynamically set to account for changing conditions, non-linearities, etc.

Figure 5:
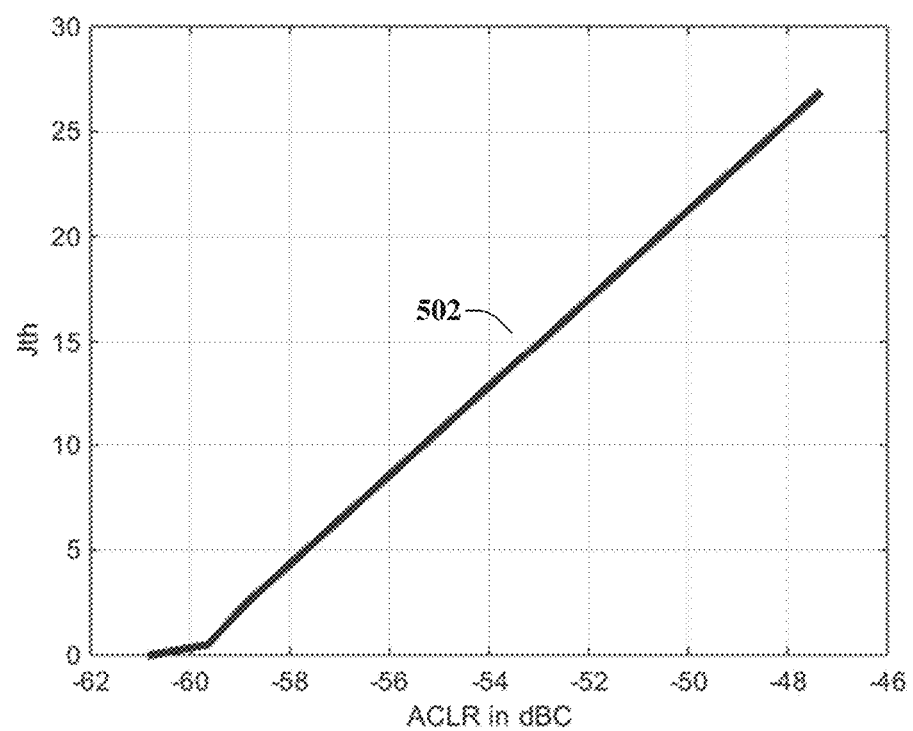
FIG. 5 illustrates an example graph showing adjacent channel leakage ratios as a function of threshold settings in accordance with various aspects and embodiments of the subject disclosure.

Turning now to FIG. 5, illustrated is an example graph 500 showing adjacent channel leakage ratios (ACLR) as a function of threshold settings in accordance with various aspects and embodiments of the subject disclosure. As the line 502 shows, as Jth increases, the ACLR increases proportionally.

Figure 6:
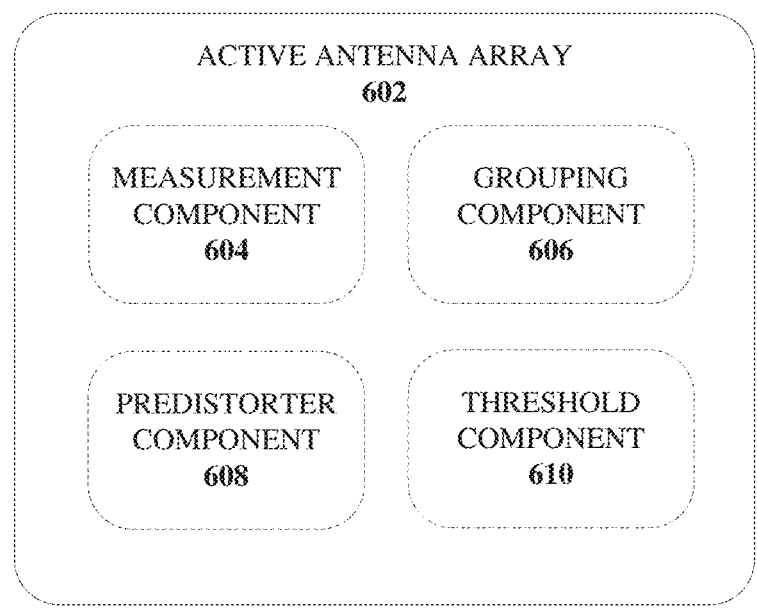
FIG. 6 illustrates an example block diagram of an active antenna array in accordance with various aspects and embodiments of the subject disclosure.

FIG. 6, illustrated is an example block diagram 600 of an active antenna array 602 in accordance with various aspects and embodiments of the subject disclosure.

Active antenna array 602 can include a measurement component 604 that measures and determines the non-linearities in each of the power amplifiers in the active antenna array 602. In an embodiment, the measurement component 604 can determine the non-linearities based on sending a known baseline signal through each of the power amplifiers and measuring the output.

The active antenna array 602 can also include a grouping component 606 that groups the power amplifiers based on their degrees of similarity. The degree of similarity can be based on cost function that measures the relative differences between the power amplifiers. The cost function for comparison between two outputs can be $J=(fi(x)-fj(x))*(fi(x)-fj(x))^H$ where i and j represent any two different power amplifiers. Based on the PAs, i and j are grouped if $J \leq J_{th}$. Jth is a predefined threshold, and as can be seen from the equation, the range of similarity is larger as Jth increases. Thus, for a small Jth, power amplifiers are not as likely to be grouped together, resulting in lower adjacent channel interference, but increased computational costs and power consumption, while for a larger Jth, the computational costs and power consumption may be reduced greatly, but there may be increased adjacent channel interference.

Active antenna array 602 can also include a predistorter component 608 that applies a DPD signal to a baseband signal to correct for the nonlinearity in a power amplifier. The DPD signal can be applied before the power amplifier amplifies the baseband signal.

The active antenna array 602 can also include a threshold component 610 that can adjust the Jth threshold depending on current conditions. In an embodiment, threshold component 610 can adjust the Jth threshold to be as high as possible, while still enabling the adjacent channel interference to meet 3GPP and other predefined standards. In other embodiments, the threshold component 610 can select the Jth threshold on user preferences, selection, and/or other criteria.

Figure 7:
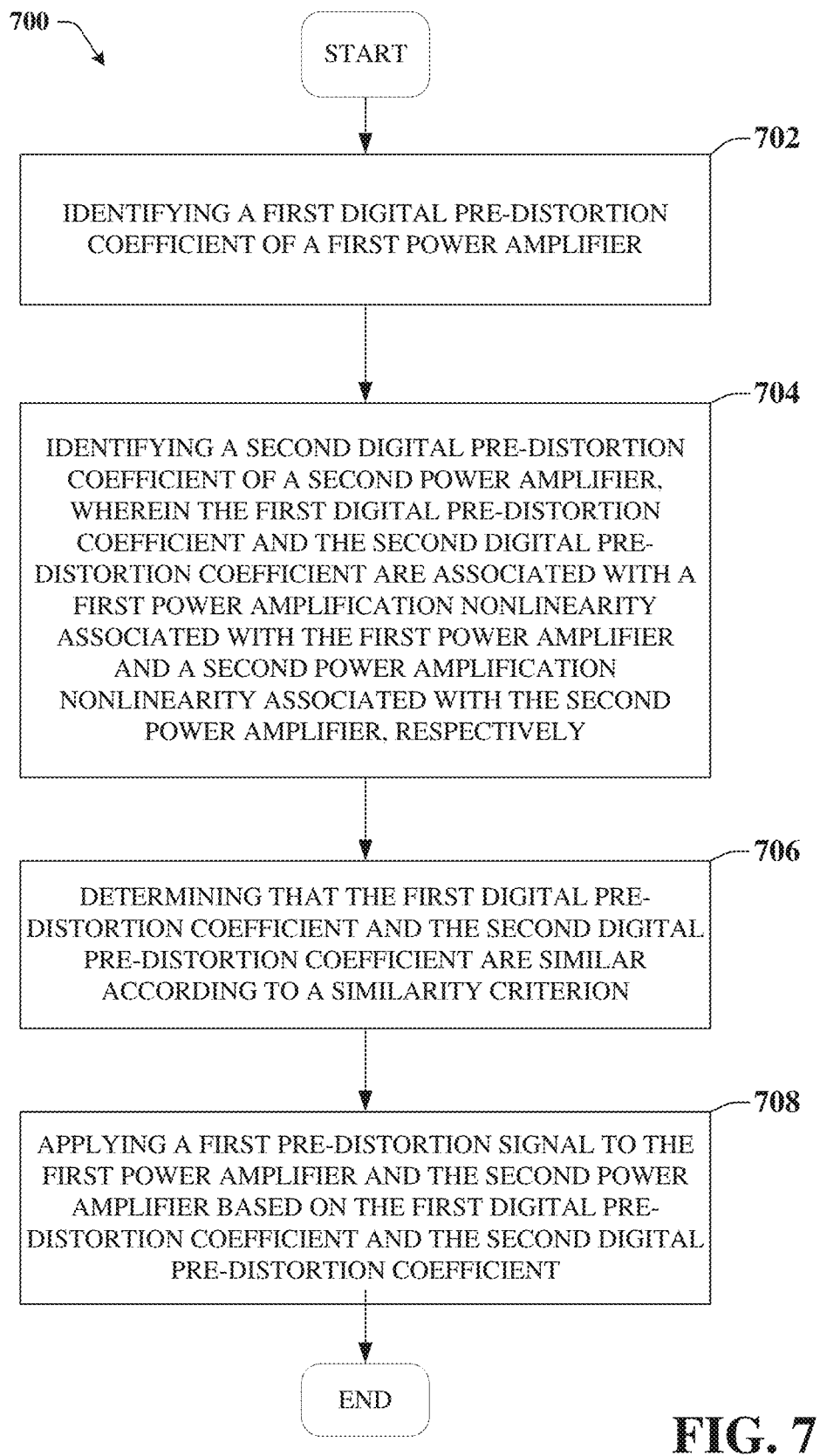
FIG. 7 illustrates an example method for providing low complexity digital predistortion for active antennas in accordance with various aspects and embodiments of the subject disclosure.
Figure 8:
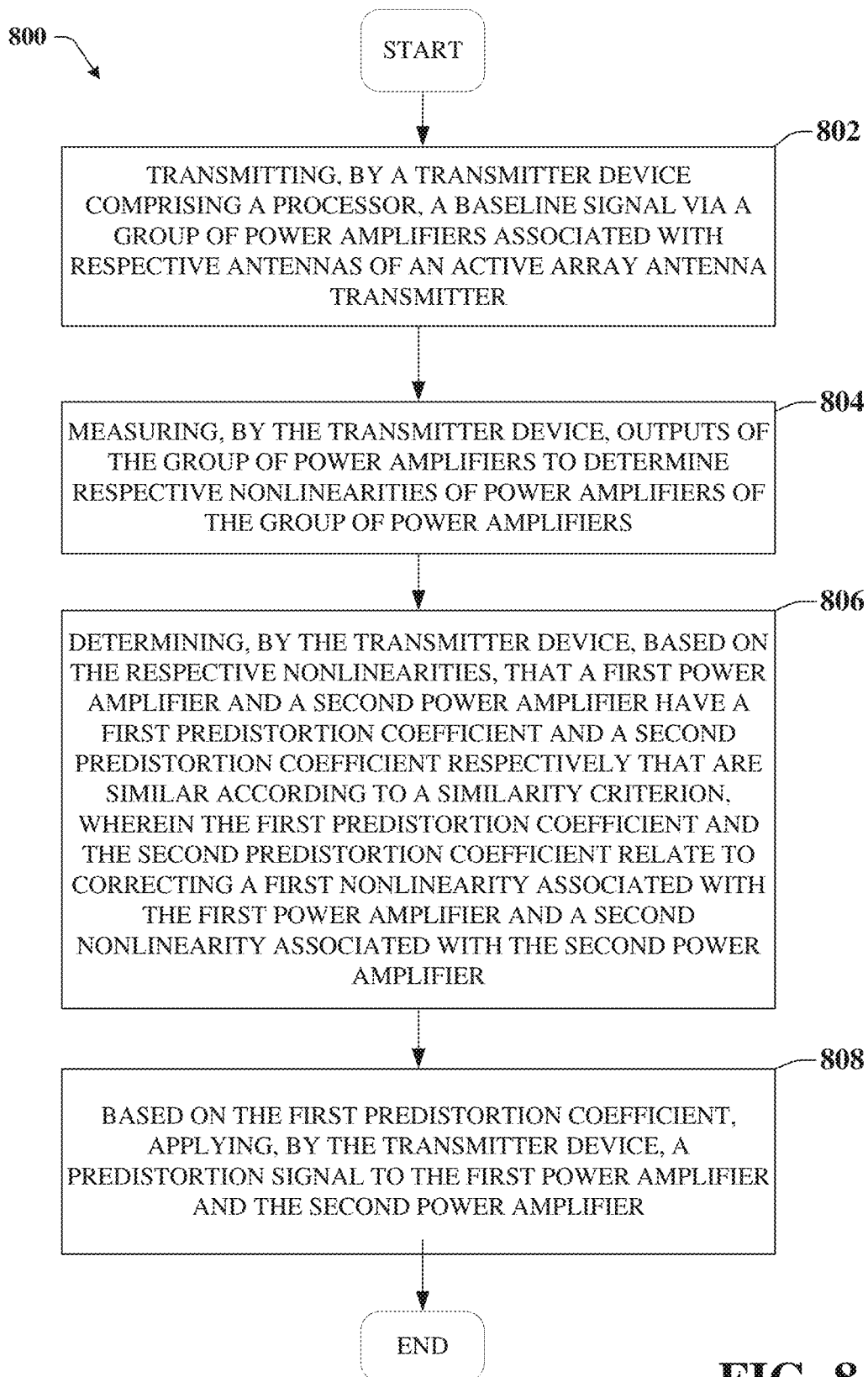
FIG. 8 illustrates an example method for providing low complexity digital predistortion for active antennas in accordance with various aspects and embodiments of the subject disclosure.

FIGS. 7-8 illustrates a process in connection with the aforementioned systems. The processes in FIGS. 7-8 can be implemented for example by the systems in FIGS. 1-6 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 illustrates an example method 700 for providing low complexity digital predistortion for active antennas in accordance with various aspects and embodiments of the subject disclosure.

Method 700 can start at 702, where the method comprises identifying a first digital pre-distortion coefficient of a first power amplifier.

At 704 the method comprises identifying a second digital pre-distortion coefficient of a second power amplifier, wherein the first digital pre-distortion coefficient and the second digital pre-distortion coefficient are associated with a first power amplification nonlinearity associated with the first power amplifier and a second power amplification nonlinearity associated with the second power amplifier, respectively.

At 706, the method comprises determining that the first digital pre-distortion coefficient and the second digital pre-distortion coefficient are similar according to a similarity criterion.

At 708, the method comprises applying a first pre-distortion signal to the first power amplifier and the second power amplifier based on the first digital pre-distortion coefficient and the second digital pre-distortion coefficient.

FIG. 8 illustrates an example method 800 for providing low complexity digital predistortion for active antennas in accordance with various aspects and embodiments of the subject disclosure.

Method 800 can start at 802, where the method comprises transmitting, by a transmitter device comprising a processor, a baseline signal via a group of power amplifiers associated with respective antennas of an active array antenna transmitter.

At 804 the method comprises measuring, by the transmitter device, outputs of the group of power amplifiers to determine respective nonlinearities of power amplifiers of the group of power amplifiers.

At 806, the method comprises determining, by the transmitter device, based on the respective nonlinearities, that a first power amplifier and a second power amplifier have a first predistortion coefficient and a second predistortion coefficient respectively that are similar according to a similarity criterion, wherein the first predistortion coefficient and the second predistortion coefficient relate to correcting a first nonlinearity associated with the first power amplifier and a second nonlinearity associated with the second power amplifier.

At 808, the method comprises based on the first predistortion coefficient, applying, by the transmitter device, a predistortion signal to the first power amplifier and the second power amplifier.

Figure 9:
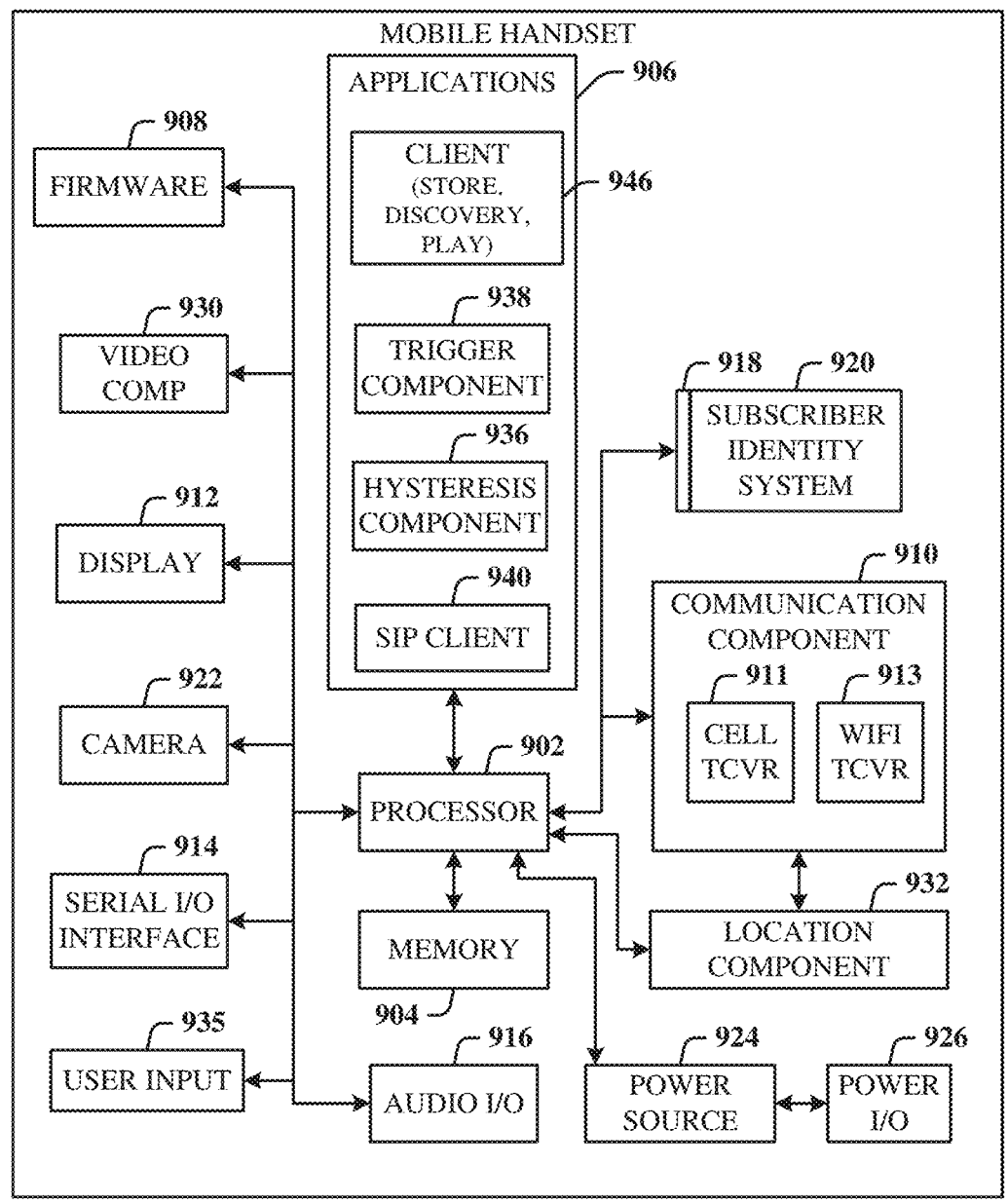
FIG. 9 illustrates an example block diagram of an example user equipment that can be a mobile handset operable to provide a format indicator in accordance with various aspects and embodiments of the subject disclosure.

Referring now to FIG. 9, illustrated is a schematic block diagram of an example end-user device such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
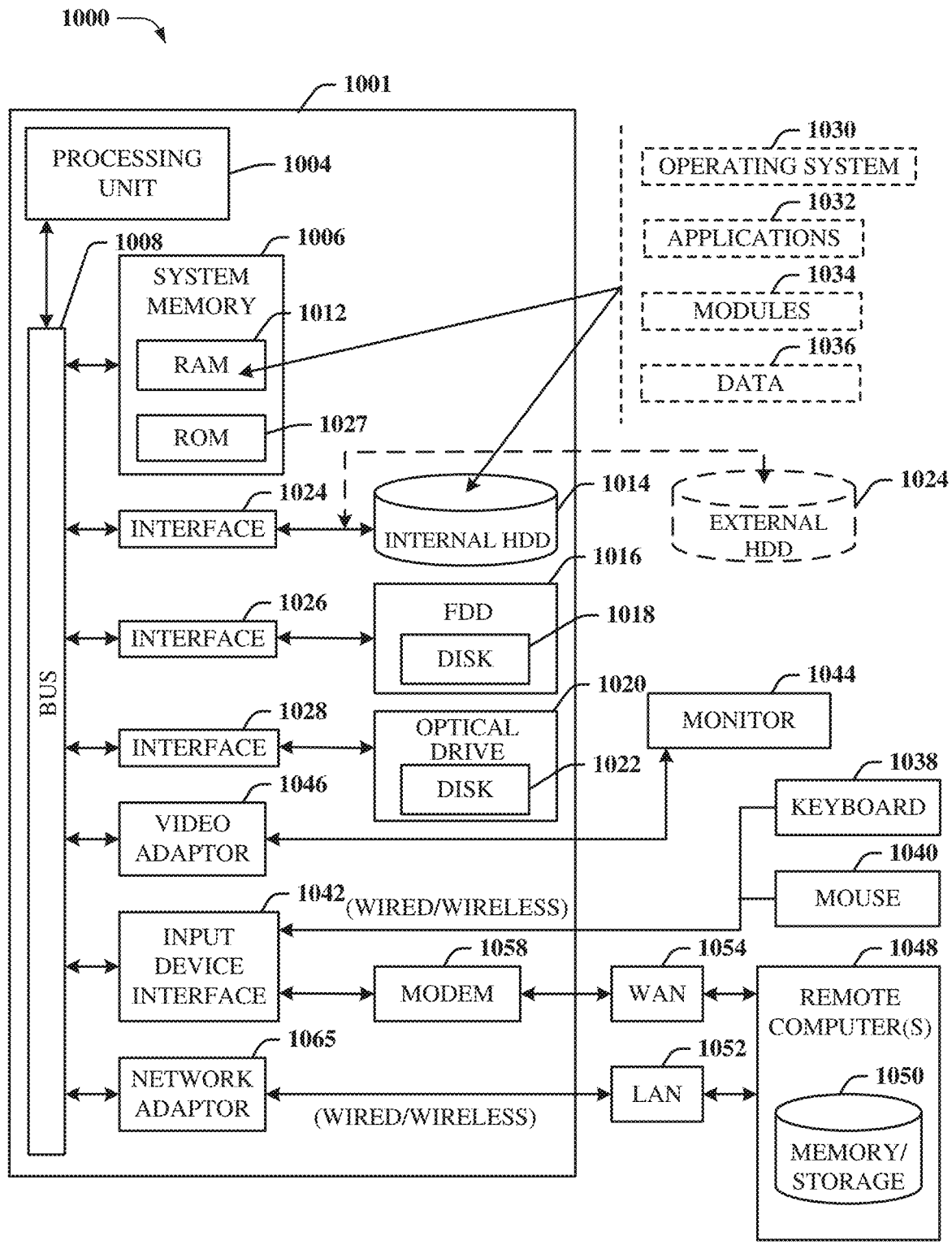
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 406) may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any datastream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:
   analyzing, by a system comprising a processor, respective output characteristics of ones of an array of antenna amplifier devices;
   based on the analyzing, pairing, by the system, from the array of antenna amplifier devices, a first antenna amplifier device usable with a second antenna amplifier device, resulting in a pair of antenna amplifier devices; and
   facilitating, by the system, concurrent use of the pair of antenna amplifier devices.

2. The method of claim 1, wherein the analyzing the respective output characteristics comprises determining respective measures of similarity of the respective output characteristics, and wherein the pairing the first antenna amplifier device and the second antenna amplifier device comprises pairing based on a measure of similarity of the respective measures of similarity satisfying a defined similarity criterion.

3. The method of claim 2, wherein the pairing based on the measure of similarity satisfying the defined similarity criterion comprises pairing the first antenna amplifier device and the second antenna amplifier device based on the measure of similarity between the first antenna amplifier device and the second antenna amplifier device being determined to be above a threshold level of similarity applicable to pairing devices of the array of antenna amplifier devices.

4. The method of claim 3, further comprising, based on a selected likelihood of adjacent channel interference, adjacent to the first antenna amplifier device and caused by the second antenna amplifier device when the pair of antenna amplifier devices are used concurrently, selecting, by the system, the threshold level of similarity.

5. The method of claim 4, further comprising:
   determining, by the system, that an environmental condition has caused an increase in an estimated likelihood of the adjacent channel interference; and
   based on the increase in the estimated likelihood, decreasing the estimated likelihood of adjacent channel interference by increasing the threshold level of similarity.

6. The method of claim 5, wherein the environmental condition comprises a change condition representative of a threshold change in an operating temperature of the first antenna amplifier device.

7. The method of claim 5, further comprising, monitoring, by the system, a signal to interference and noise ratio of transmissions by an antenna associated with the first antenna amplifier device, resulting in a monitored signal to interference and noise ratio, wherein the environmental condition comprises a change condition representative of a threshold decrease in the signal to interference and noise ratio that is monitored.

8. The method of claim 3, further comprising, based on a selected power consumption level of the array of antenna amplifier devices, selecting, by the system, the threshold level of similarity.

9. The method of claim 8, further comprising:
   based on an estimated power consumption level being determined to be above the selected power consumption level, reducing, by the system, the threshold level of similarity; and
   based on the reducing of the threshold level of similarity causing an increase in pairing of other pairs of antenna amplifier devices of the array of antenna amplifier devices other than the pair of antenna amplifier devices, reducing, by the system, the estimated power consumption level for the array of antenna amplifier devices.

10. The method of claim 9, wherein the array of antenna amplifier devices is comprised in a user equipment, and wherein the estimated power consumption level being determined to be above the selected power consumption level corresponds to a change to a battery saving mode by the user equipment.

11. The method of claim 10, wherein the array of antenna amplifier devices comprises a multiple input multiple output transceiver of the user equipment.

12. The method of claim 3, further comprising:
    selecting, by the system, the threshold level of similarity based on a selected computational cost of controlling the array of antenna amplifier devices.

13. The method of claim 3, further comprising:
    determining, by the system, that an estimated computational cost of controlling the array of antenna amplifier devices has undergone an increase; and
    based on the increase in the estimated computational cost, decreasing the estimated computational cost comprising decreasing the threshold level of similarity.

14. The method of claim 1, wherein the respective output characteristics comprise respective measurements of amplification nonlinearity of the ones of the array of antenna amplifier devices.

15. An apparatus comprising:
    a processor; and
    a memory that stores executable instructions that, when executed by the processor, facilitate performance of operations, the operations comprising:
    analyzing respective output characteristics of ones of an array of antenna amplifier devices;
    based on the analyzing, pairing from the array of antenna amplifier devices, a first antenna amplifier device usable with a second antenna amplifier device, resulting in a pair of antenna amplifier devices; and
    facilitating concurrent use of the pair of antenna amplifier devices.

16. The apparatus of claim 15, wherein the analyzing the respective output characteristics comprises determining respective measures of similarity of the respective output characteristics, and wherein the pairing the first antenna amplifier device and the second antenna amplifier device comprises pairing based on a measure of similarity of the respective measures of similarity satisfying a defined similarity criterion.

17. The apparatus of claim 16, wherein the pairing based on the measure of similarity satisfying the defined similarity criterion comprises pairing the first antenna amplifier device and the second antenna amplifier device based on the measure of similarity between the first antenna amplifier device and the second antenna amplifier device being determined to be above a threshold level of similarity applicable to pairing devices of the array of antenna amplifier devices.

18. A non-transitory machine-readable medium, comprising executable instructions that, when executed by a processor, facilitate performance of operations, the operations comprising:
    analyzing respective output characteristics of ones of an array of antenna amplifier devices;
    based on the analyzing, pairing from the array of antenna amplifier devices, a first antenna amplifier device usable with a second antenna amplifier device, resulting in a pair of antenna amplifier devices; and facilitating concurrent use of the pair of antenna amplifier devices.

19. The non-transitory machine-readable medium of claim 18, wherein the analyzing the respective output characteristics comprises determining respective measures of similarity of the respective output characteristics, and wherein the pairing the first antenna amplifier device and the second antenna amplifier device comprises pairing based on a measure of similarity of the respective measures of similarity satisfying a defined similarity criterion.

20. The non-transitory machine-readable medium of claim 19, wherein the pairing based on the measure of similarity satisfying the defined similarity criterion comprises pairing the first antenna amplifier device and the second antenna amplifier device based on the measure of similarity between the first antenna amplifier device and the second antenna amplifier device being determined to be above a threshold level of similarity applicable to pairing devices of the array of antenna amplifier devices.

* * * * *